May 26, 1970
C. J. DOMINICK
3,513,542
INSPECTION KNIFE
Filed Jan. 2, 1968
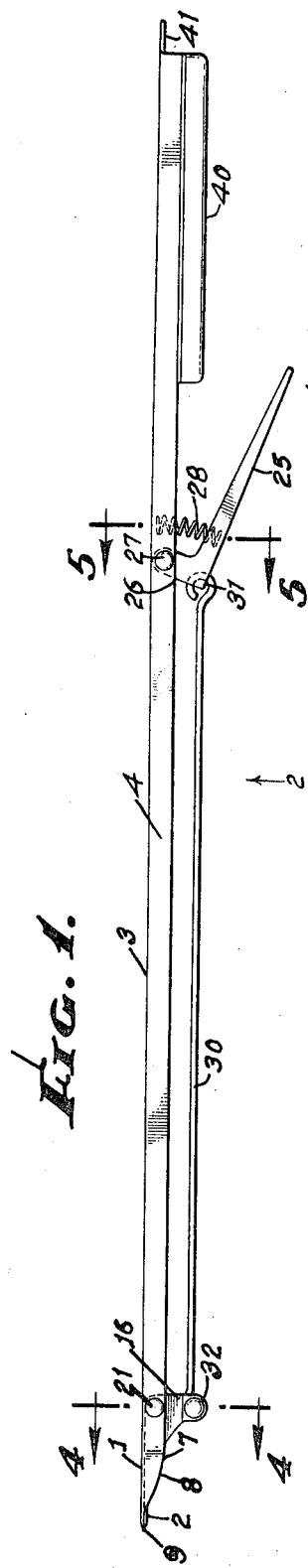
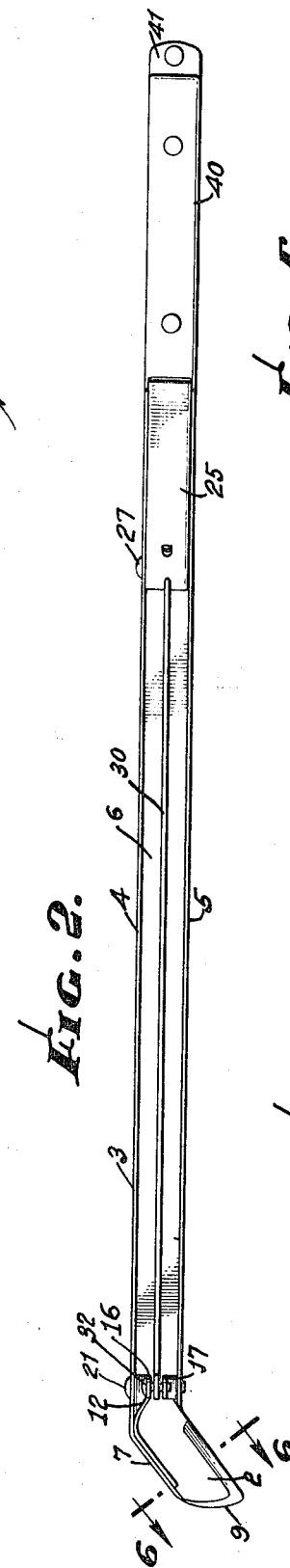
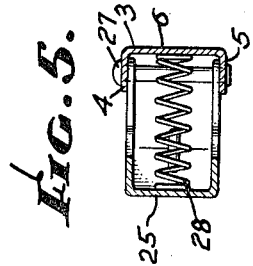
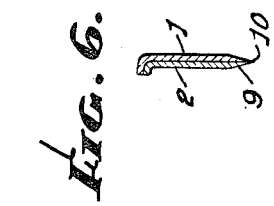
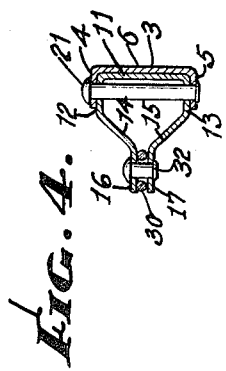
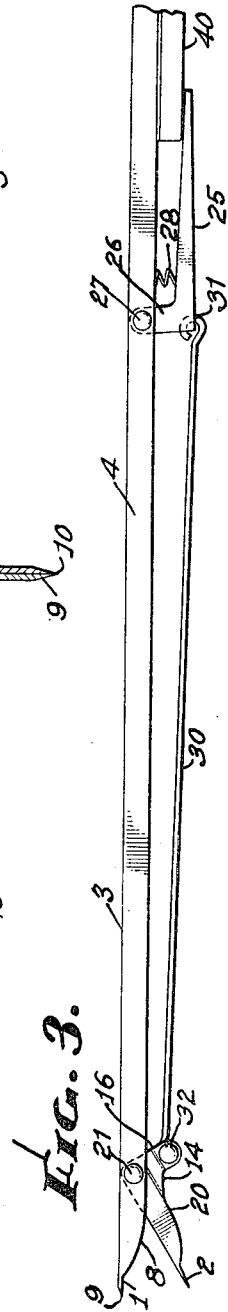
INVENTOR,
CHARLES J. DOMINICK,
By Calvin Brown,
ATTORNEY.

United States Patent Office 3,513,542
Patented May 26, 1970

3,513,542
INSPECTION KNIFE
Charles J. Dominick, 3024 Durfee Ave.,
El Monte, Calif. 91732
Filed Jan. 2, 1968, Ser. No. 694,981
Int. Cl. B26b 11/00
U.S. Cl. 30—123                                    5 Claims

ABSTRACT OF THE DISCLOSURE

The device contemplates a knife having two blades each associated with an elongated shank provided with a handle. One blade is pivoted to the other blade and a lever is provided which when moved will swing the pivoted blade away from the other blade, the blades normally being parallel and in juxtaposition. The blades have plane surfaces which are sharpened so that the bevels thereof extend from the outer plane surface inwardly toward the edge to provide a combined slicing or cutting edge. When meat is being broiled, a cut may be made in the meat body by the two blades followed by separating one blade relative to the other blade to expose the interior of the meat and to give the cook or chef a visual view of the meat to determine the degree of cooking thereof throughout the body of the meat, such as well done, medium or rare.

---

An object of the invention is the provision of an inspection knife for meats which permits visual inspection of the interior of meat to determine the degree of cooking thereof.

A further object is the provision of an inspection knife for meats, of simple construction, ease of operation, inexpensive in cost of manufacture and which is superior to cutting meat with a knife and then using a fork and a knife to determine the rareness thereof, or how well done the meat may be throughout the body of the meat.

A particular feature of the inspection knife resides in the use thereof for bar-B-ques, where it is sometimes difficult while bar-B-quing meat, or broiling meat, to make any inspection of, say, steaks, to determine whether the steak is well done or rare, and the degree of rareness. The present device utilizes a long shank member terminating in a blade, together with a second blade which is pivoted to the first blade shank, and which second blade is movable relative to the first blade, together with means whereby the blades are automatically held in juxtaposition.

A further object is the provision of an inspection knife which is attractive in appearance, foolproof in operation, and generally superior to devices now used for determining the rareness of meat or other objects which are being bar-B-qued or cooked.

With the above and other objects in view, the invention consists in the novel and useful provision, formation, construction, association and relative arrangement of parts, members and features, all as shown in one embodiment in the accompanying drawing, described generally and more particularly pointed out in the claims.

In the drawing:

FIG. 1 is a top plan view of the inspection knife as an entirety;

FIG. 2 is a side elevation of the knife of FIG. 1, looking in the direction of the arrow 2 of FIG. 1;

FIG. 3 is a view similar to that of FIG. 1, one blade being in moved position;

FIG. 4 is an enlarged cross sectional view on the line 4—4 of FIG. 1;

FIG. 5 is an enlarged cross sectional view on the line 5—5 of FIG. 1; and

FIG. 6 is an enlarged cross sectional view on the line 6—6 of FIG. 2.

Referring to the drawing, I have shown in FIG. 1 the inspection knife which comprises two blades 1 and 2, the blade 1 is joined or integral with an elongated shank 3 which does not have a sharp edge but is of channel form and provided with upper and lower flanges 4 and 5 and a web 6. The blade 1 is so formed as to be a continuation of the flange 4 at the upper edge of said blade as shown at 7, the flange being curved toward the plane of the web as shown at 8 where it merges with the sharpened edge 9 of the blade. It will be noted in FIG. 2 that the upper and lower edges of blade 1 are at an obtuse angle to the flanges 4 and 5 and thus the blade 1 extends downwardly relative to the shank. The blade is sharpened by beveling from the outer plane surface of the blade toward the inner plane surface to a sharp edge, as shown in FIG. 6 at 10. Thus the nose of the blade, as well as the lower edge thereof has a sharp pointed edge. The blade 2 may fit closely against the blade 1 and the blade 2 is provided with a web 11 having a pair of flanges 12 and 13, the latter flanges fitting within the flanges 4 and 5 of the shank 3, with the flanges extended at 14 and 15 convergently and then provided with two flat members 16 and 17, which are spaced apart. The lower flange 13 of blade 2 is terminated at the sharpened bottom edge thereof. Thus blade 2 is sharp along its bottom edge and at its nose portion the same as for the blade 1, the bevel forming the sharp edge extending from the outer surface of blade 2 towards the inner surface thereof, as shown in FIG. 6. When the blades are closed together as shown in FIG. 6, the two beveled edges will cooperate to form the sharp edge shown at 10. The flanges of the blades 1 and 2 cooperate to support the blades when in juxtaposition and during a cutting operation of some object by the blades. Possibly the flange 8 is reduced as to width as is the flange shown at 7 so as to not obscure a visual view between the two blades when the blades are moved to the position of FIG. 3 from that of FIG. 1. In this respect it is to be noted from FIG. 3 that the upper flange 12 of blade 2 follows the contour or outline of the flange 7 of blade 1, as indicated at 20. A pivot pin 21 extends transversely through the flanges 4, 5, 12 and 13 to tie the two blades together and to allow separation of the blades, as shown in FIG. 3. To effect movement of the blade 2, a lever 25 is provided, the lever having an angular end 26, which is pivoted between the flanges 4 and 5 of shank 3 by means of a pin 27, see FIG. 5. Preferably the lever 25 is of channel form as shown in FIG. 5 and a coil spring 28 is provided for swinging the handle away from the shank 3, as shown in FIG. 1. A rod link 30 joins the lever at the angular end 26 as shown at 31 and, likewise, is connected between the flat members 16 and 17 by a pin 32. In this manner the lever 25 may move the blade 2 from the position of FIG. 1 to that of FIG. 3. The shank 3 is provided with a handle 40 and, likewise, may be provided with a perforated lug 41 whereby the inspection knife may be secured on a hook when not in use.

The operation, uses and advantages of the invention are as follows.

The device is useful for the inspection of bar-B-qued meat to determine the rarity thereof. The device is light and easily handled and may be of any length desired depending upon the purpose for which it is to be used, whether for bar-B-quing or for ordinary cooking or for the broiling of meats, particularly steaks. The device during the broiling of, say, a steak, is used by the cook after a period of time determined by the cook, to cut a slit in the body of the meat by means of the sharp edges of the two blades and the pointed nose portion when the blades are in juxtaposition, or the position shown in FIG. 6. This cutting operation opens the body of the meat at some selected point whereupon movement of the lever 25 toward shank 3 will swing the blade 2 away from the blade 1 to separate the body of the meat inward of the slit and allow visual inspection of the meat to determine the rarity thereof and if it requires further cooking. The parts of the device are so related as to not present any particular obstruction to the operation of the inspection knife. The inspection knife may be made from stainless steel and may be chromium plated to add to its attractiveness and to provide blades which will function for a period of time without resharpening.

I claim:
1. An implement for facilitating visual inspection of the interior of a cooked food comprising, in combination,
  (a) a single straight shank having a blade fixed thereto at one end, said blade being generally flat and having a sharpened edge and being inclined at an obtuse angle to the longitudinal axis of the shank;
  (b) a second generally flat blade having approximately the same dimensions as the first named blade and normally lying flat against the first blade and having a sharpened edge normally alongside of the sharpened edge of the first blade and forming therewith a single cutting edge;
  (c) pivot means connecting the second blade at one end to said shank and permitting swinging of the second blade relative to the first blade;
  (d) and means supported on said shank and operable by the user's hand to swing the second blade away from the first blade, a spring being interposed between the shank and said blade-swinging means to automatically restore the second blade to its normal position when the user's hand releases the blade-swinging means.

2. The invention defined in claim 1, wherein the two blades each have two sharpened edges joined by a sharpened nose; the sharpened edges and noses being formed by beveling from the outer plane surfaces of the blades toward the inner plane surfaces thereof, said sharpened edges and noses together forming a single cutting edge, when the inner plane surfaces of the blades are in contact.

3. The invention defined in claim 1, wherein the shank is channel-shaped; the pivot means for the second blade being supported by the two flanges of the channel; said blade-swinging means including a lever pivoted on said channel flanges; said spring being interposed between the web of said channel and said lever to cause the lever to normally assume a position at an angle to the shank, whereby it may be readily grasped and swung by the hand which grips the shank; and means connecting said lever with the second blade so that manual swinging of said lever toward the shank causes the aforesaid swinging of the second blade away from the first blade.

4. The invention defined in claim 3, wherein the means connecting said lever with the second blade includes a straight rod link pivotally connected at one end to said lever, said rod link being generally parallel to the shank; two flanges being fixed to the second blade and extending outwardly therefrom and converging; said rod link being pivotally connected at its other end to the outer ends of said two converging flanges.

5. The invention defined in claim 4, wherein the first blade has an integral flange which is a continuation of the upper flange of the channel-shaped shank, and the second blade has an integral flange which fits inside the flange of the first blade and which is integral with the upper of said two converging flanges.

References Cited

UNITED STATES PATENTS

| | | | |
|---|---|---|---|
| 875,240 | 12/1907 | Brown | 30—251 |
| 1,084,990 | 1/1914 | Williams | 30—305 |
| 1,326,373 | 12/1919 | Rice | 30—24 |
| 1,754,806 | 4/1930 | Stevenson | 30—251 X |

FOREIGN PATENTS 12,004     1889     Great Britain.

ROBERT C. RIORDON Primary Examiner

J. C. PETERS, Assistant Examiner

U.S. Cl. X.R.

7—14